March 17, 1936.　　　H. H. EATON　　　2,034,673
COIL WINDING MACHINE
Filed Feb. 6, 1923　　　10 Sheets-Sheet 1

Harrison H Eaton, Inventor
By Braselton, Whitcomb + Davies
Attorneys

March 17, 1936.  H. H. EATON  2,034,673

COIL WINDING MACHINE

Filed Feb. 6, 1923   10 Sheets-Sheet 3

Harrison H Eaton
Inventor

By
Braselton Whitcomb & Davis Attorneys

March 17, 1936.     H. H. EATON     2,034,673
COIL WINDING MACHINE
Filed Feb. 6, 1923     10 Sheets-Sheet 5

Harrison H. Eaton Inventor
By Braselton, Whitcomb & Davies
Attorney

March 17, 1936.  H. H. EATON  2,034,673
COIL WINDING MACHINE
Filed Feb. 6, 1923   10 Sheets-Sheet 6

March 17, 1936.  H. H. EATON  2,034,673
COIL WINDING MACHINE
Filed Feb. 6, 1928   10 Sheets-Sheet 8

Harrison H. Eaton Inventor

By Braselton, Whitcomb & Davies Attorneys

March 17, 1936.  H. H. EATON  2,034,673
COIL WINDING MACHINE
Filed Feb. 6, 1923  10 Sheets-Sheet 9

Fig-XVIII-A

Fig-XVIII-B

Fig-XVIII-C

Fig-XIX

Fig-XX

Inventor
Harrison H. Eaton
By Braselton, Whitcomb & Davies
Attorneys

Patented Mar. 17, 1936

2,034,673

UNITED STATES PATENT OFFICE 2,034,673

COIL WINDING MACHINE

Harrison H. Eaton, Toledo, Ohio, assignor to The Electric Auto-Lite Company, Toledo, Ohio, a corporation of Ohio Application February 6, 1928, Serial No. 252,345

8 Claims. (Cl. 242—10)

This invention relates to means for winding strand material or strips into coils, rolls, helices or other formations produced by superposing convolutions of a winding material and introducing sheet material between the convolutions.

An object of the invention is to provide a machine in which one or a plurality of coils may be wound simultaneously in a rapid, efficient, accurate and economical manner; said coils having successive layers of winding material such as wire, separated by sheet material, such as insulating paper or other textile fabric, the sheet material being supplied from a common source to all of the coils or to some of them only if desired.

One object of the invention also is to provide a machine of the type specified having simplified automatically operated means for inserting a sheet of paper or material during the winding operation so as to provide insulation between the layers of wire.

Another object of the invention is to provide improved and efficient mechanical arrangement of parts constituting a means for supplying the paper or sheet material from a continuous strip and for severing the strip in progressively increasing lengths as the diameter of the coils increase.

Another object of the present invention is to provide improved means to insure the insertion of the insulating material between the layers of wire of the coil at the proper time evenly and smoothly, without danger of folding, tearing or injuring the same and insuring its proper overlaying with respect to the layers of wire in the coil, and to obtain these results regardless of the length and width of the insulating material thereby producing a higher grade of coils.

Other objects of the invention are to provide a coil winding machine wherein the machine is automatically stopped by electrical means after certain desired numbers of layers have been wound to change its mode of operation or to permit the removing of the spindle and the coils wound thereon together as a unit and to stop the machine when the wire breaks.

Another object of the invention is to provide a coil winding machine so arranged that it eliminates changes required in the replacement of a rotating spindle to render a continuity of operation, thus increasing the efficiency of the machine for large scale production.

Another object of the invention is to provide a coil winding machine so arranged that it provides a variation in the spacing of turns of wire during the coil winding operation as changing to a close winding from a spaced or spiral winding at the beginning after a few layers have been spirally wound and also a change near the end of the coil to spiral winding thereby obtaining a coil having better electrical and mechanical characteristics than have heretofore been produced.

A further object of the present invention is to provide improved means with a machine winding a plurality of coils to facilitate the severing of the insulation between the different coils actuated at intervals automatically or by the operator while winding the coils.

Further objects are within the scope of the invention such as relate to the arrangement of the elements of the structure to various details of construction, economies of manufacture and numerous other features as will be apparent from a consideration of the drawings, and related description of a form of the invention which may be preferred in which:

Figure 3A is a sectional view of the coil guiding mechanism.

Figure 4A is a detail view of the speed changing mechanism.

Figure 5A is a side view illustrating the holding mechanism for one end of the spindle.

Figure 7A is a sectional view of the over running clutch.

Figure 14 is a detail view of a modification of the drive control.

Figure 15 is a plan view showing the modified drive mechanism.

Figure 16 is a top plan view of a detail thereof.

Figure 16A is a side elevation thereof.

Figure 16B is a detail view of a part of the modified mechanism.

Figures 17 and 17A are details of the manual connections.

Figures 18, 18A, 18B and 18C are diagrammatic and structural views of the automatic electric control.

Figures 19 and 20 are diagrammatic views of the automatic means to stop the machine when the wire breaks.

In making electrical coils it is found desirable to insulate several layers of the wire convolutions adjacent the outer surface of said coil more heavily than the layers which intervene between the core and the surface. Such coil construction produces coils of large diameter incurring a great expense, due not only to the extra insulation but to the amount of wire used.

I provide a machine for making a coil in which the expense above referred to is eliminated and better electrical characteristics than the usual construction above referred to are produced by winding several layers of wire in which the turns are separated or spirally wound, said layers being located adjacent to the core and at the surface of the coil as compared with the close wound turns in the other layers of said coil.

Figure 1:
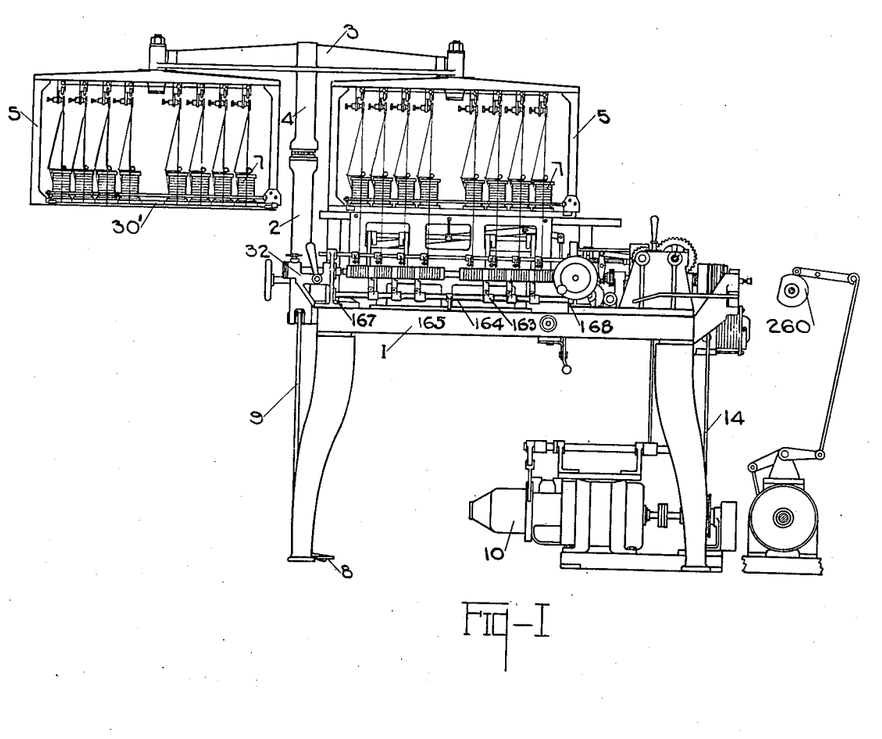
Figure 1 is a front elevation of the preferred embodiment of my invention.

Furthermore, by my machine I provide a structure in which one set of spools of wire may be drawn from in winding the coils on a spindle located in the winding mechanism while another set of spools is placed in or "loaded" into a rack or frame 5 of the machine with the wires properly located on the inner tubes of the coils which in turn are properly positioned on a duplicate winding spindle 30', and upon completion of one set of coils, the spindle 30' is placed in winding position in the machine. Thus, in Figure 1 is seen the machine bed which has an upright 2 separated by ball bearings from an upper turn post 4 which carries a crosshead 3, the latter pivotally carrying the two duplicate swinging racks 5. On each of the racks 5 are located a plurality of bobbins 7, the wire from each of which passes up over a holding and automatically stopping mechanism hereinafter described and passes down to be wound on the cardboard insulating cores of the coils which are located lengthwise on the main driving spindle, the one shown at the left in Figure 1 being a duplicate of the one actually located in the driving mechanism of the machine and shown carried by the frame 1. A foot lever 8 controls a lifting rod 9 which the operator employs in raising the frames 5 so that the same may be swung around the spindle 2 on the ball bearings referred to above.

Figures 21, 22, 23, 24, 25, 26:
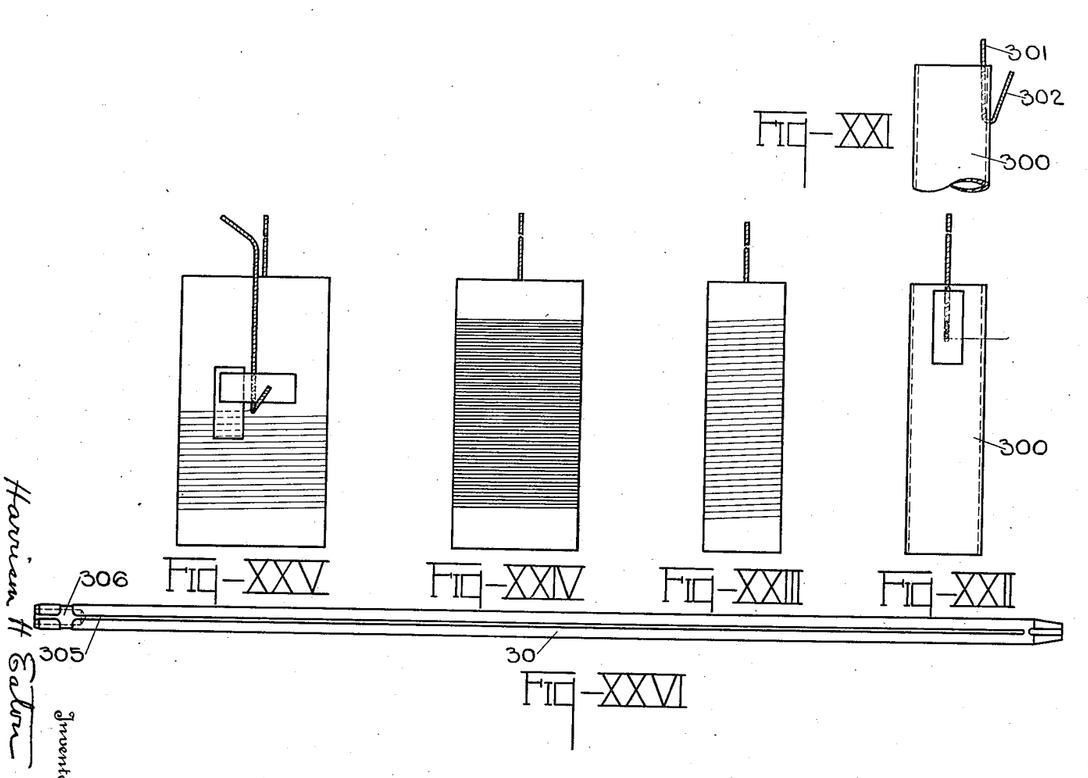
Figures 21 to 25 are elevations of the coil at different stages of completion.
Figure 26 is a plan view of the main holding and driving spindle of the machine.

The main winding is accomplished by rotating the winding spindle 30 to which the cardboard insulating cores 300 are located, whereupon the wire is wound in a plurality of layers separated by insulating material supplied thereto in timed relation. Said cardboard insulating cores 300 (see Figures 21 and 22) are provided with a flexible wire 301 of larger diameter than the wire from the source of supply and fixed thereto. Said wire passes through the cores as illustrated in Figure 21 and one of its ends cooperates with a groove on spindle 30 and acts as driving connection between spindle and cores drawing wire from the wire supply bobbins 7.

To rotate the spindle so as to wind simultaneously a plurality of coils an axial recess is provided on the main driving shaft 15 into which one end of the winding spindle 30 may be removably chucked in order to turn the same. In order to support the other end of the spindle I provide a small frame 32 (Figure 5) which has a bearing block and carries a short shaft terminating in a bearing pin 33 fitted to enter a recess in the end of said spindle. In order to remove the spindle after winding the coils said bearing pin is moved longitudinally by a rack 31 cooperating with a pinion 37 the latter actuated by a lever 34. During the winding operation the bearing pin 33 is held in the desired position by the tightening action of a screw threaded member 35 acting on the main body of said bearing pin. In this frame 32 mounted on the main frame 1 I provide a suitable bearing 36 for one end of the reciprocating shaft of the wire guiding mechanism.

The main driving shaft 15 which in turn drives the spindle 30 (see Figure 4) is rotated by means of a suitable source of power. To control said driving action I provide a suitable clutch (see Figure 2) which comprises a rotating clutch member loosely mounted on said shaft 15 formed with a pulley groove 13 and driven by a belt 14. Said clutch member 12 cooperates with a longitudinally slidable clutch member 16 fixed to the main driving shaft 15. Clutch member 16 carries contact rings of leather or other suitable friction material and is adapted to be driven by the rotating clutch member 12 whenever they come into contact by the movement of lever 17 actuated by the operator, which in turn by pin 18 forces a forked lever 19 journalled upon a pin 20 fixed on the frame of the machine, against spring 21 to contact the clutch members. The forked lever 19 is held in position by the engagement of the projecting member 22 with a lever 23 controlled by the plunger of solenoid 24. The forked lever 19 is so constructed as to close the solenoid circuit contacts 25 and 26 so that whenever this solenoid is energized the forked lever will be released and by the tension of spring 21 the clutch members not only will be separated, but the slidable clutch member 16 will be forced into contact with leather disc 27 fixed to the frame of the machine to actuate as a brake whereby the mechanism is instantaneously stopped.

To wind the wire in layers I provide a reciprocating wire guiding traverse mechanism (shown in Figures 2 and 3) which includes a plurality of wire guiding devices 65 fixed to a reciprocating shaft 64 mounted on suitable bearings 36 and 63 and actuated by a feed nut 66 mounted on shaft 64 having screw threaded surfaces 67 and 68 adapted to be engaged respectively by the shifting member 69 also mounted on said reciprocating shaft, with two feed screw threaded shafts 57 and 60 rotating in opposite directions, thereby producing the reciprocating movement of the wire guides 65.

Figures 2, 3, 4:
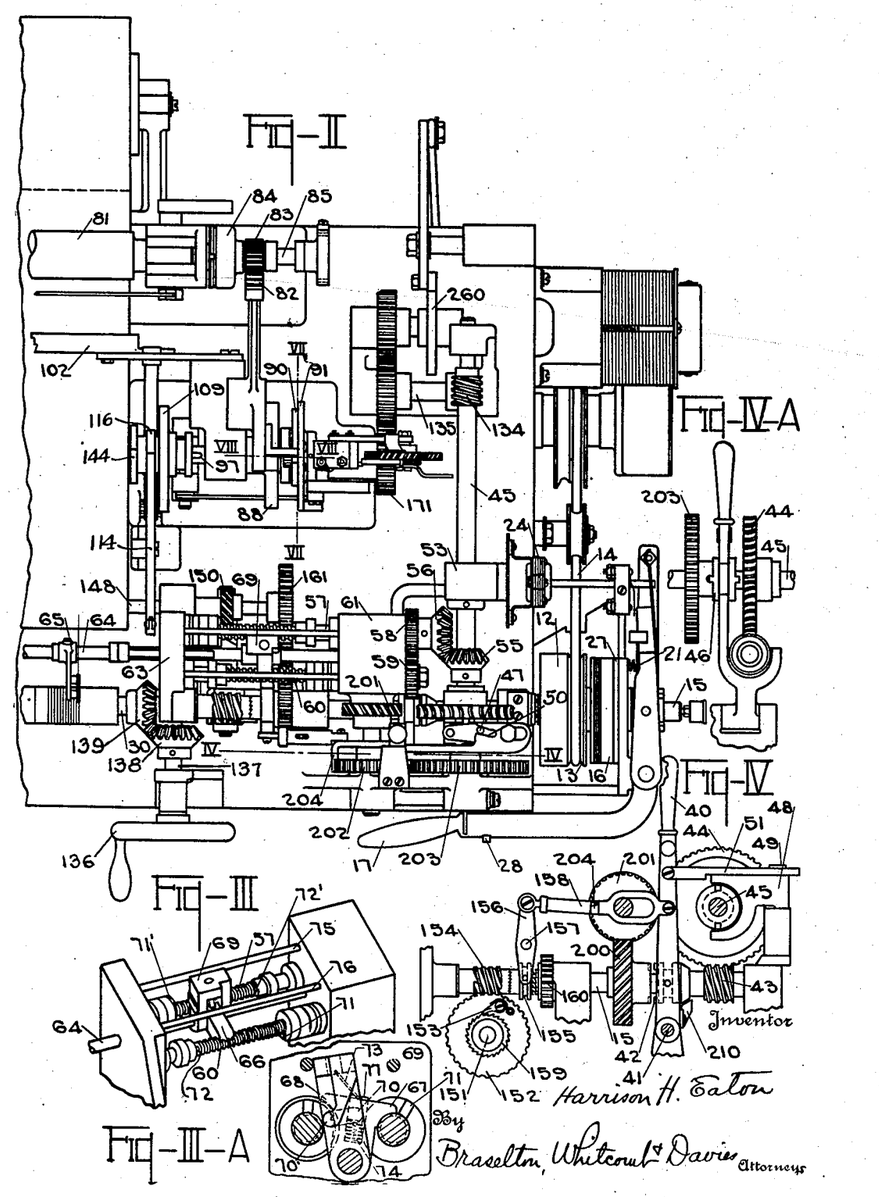
Figure 2 is a plan view of a portion of the coil winding machine constructed in accordance with the invention.
Figure 3 is a perspective view of the coil guiding mechanism.
Figure 4 is a side elevation of the speed changing mechanism taken on line IV—IV of Figure 2.

To shift the feed nut 66 from one screw threaded shaft into engagement with the other the rocking member 69 has cam surfaces 70 and 70' diagonally opposite and adapted to cooperate with projections 71 and 71' located at the respective ends of each screw threaded shafts 57 and 60. Said shifting member 69 is actuated by the opposite shaft into which the feed nut is engaged. A flat metal piece 73 is secured in the rocking member 69 and bears against plug 77 inserted in the center of the feed nut 66 under which a spiral spring 74 is housed. The cams 71 and 71' located on shafts 57 and 60 respectively are of such length and contour that when the cams 70 and 70' of the rocking member come in contact the rocking member is thrown past center and by such action forces metal piece 73 to bear down on plug 77 compressing spring 74 which throws the feed nut 66 in opposite direction. To obtain a very rapid shifting of the feed nut 66 I provide auxiliary projections 72 and 72', diagonally opposite, that impart motion to the feed nut 66 helping thereby the rocking motion produced by the shifting member 69. The reaction of spring 74 then completes the shifting and holds the feed nut against the respective screw shaft by the tension of spring against the rocking member which is forced in contact with the guide rods 75 and 76 provided to limit its travel and to insure the proper actuation of the cam surfaces above referred to. Said screw threaded shafts 57 and 60 are driven from the main drive shaft by gears 59 and 58 mounted on each shaft respectively. Said gears are actuated by a gear 56 mounted on shaft 57 driven by gear 55 fixed to counter shaft 45.

I provide means to drive the counter shaft 45 at different speeds in relation to the speed of the main driving shaft in order to produce the close or spirally wound turns used in my coil construction, in which the great majority of said layers is of the close type. To change the speed of counter shaft 45 in relation to the main drive shaft I provide a mechanism arranged in such manner as to be controlled by the movement of a lever 40 actuated by the operator. Thus, as shown in Figures 2, 4 and 4A said lever 40 is pivoted at 41 and controls the engagement of sliding collar 42 fixed to shaft 15 with gear 200 or with worm 43 and simultaneously controls by same movement the engagement of either worm wheel 44 or gear 203 at the sliding collar 46 fixed to shaft 45. The actuation of said lever also controls the gearing mechanism used to drive the continuously rotating roller 110 of the transferring means as hereinafter will fully appear.

To obtain the close winding the lever is moved to the right and by said action the worm 43 Figure 4 is in engagement with the sliding collar 42 fixed to shaft 15. Said worm 43 meshes with worm wheel 44 which is brought into driving engagement with shaft 45 by the cooperating action of a projection 47 of a forked member 48 pivoted at 49 and the cam surfaces 50 of a slidable member 51 fixed to said lever whereby a driving connection is established between the main driving shaft 15 and the counter shaft 45 which drives the gearing mechanism for the reciprocating wire guides.

In the cycle of operation of my machine I desire to change from the close wound turns to the spirally wound so I provide automatic means to stop the machine as hereinafter will be described, permitting the operator to change the gear connections. The change is obtained by moving lever 40 to the left. Said action produces the engagement of projections of collar 42 with its corresponding notches in gear 200. Said gear meshes with gear 201 driving gear 202 which in turn drives 203 which drives counter shaft 45 by the engagement of its notches with the corresponding projections on sliding collar 46 fixed to said shaft. The collar 46 is moved into engagement by the cooperating action of projection 47 of the forked lever 48 pivoted at 49 and the cam surfaces 50 of the slidable member 51 fixed to said lever 40 whereby different gears are used as a driving connection to the reciprocating wire guiding mechanism.

To prevent the rotation of loose worm 43 mounted on main driving shaft 15 while out of engagement with collar 42, I provide a stop member 210 fixed to lever 40 and actuated to hold the same in place, thereby permitting the engagement with said collar and releasing the same when said engagement takes place. To insure the successful engagement of collar 42 with gear 200 I provide an arm 204 fixed on lever 40 adapted to lock in position gear 202 while said collar is out of engagement with gear 200 and to release the same when such engagement takes place.

The sheet of insulating material used between adjacent layers of wire in the coil increases progressively in length as the diameter of the coil increases. To obtain this, I provide a measuring mechanism which comprises two cooperating rollers 79 and 81 which draw the paper from the source of supply and advance the same in increasing amounts to the transferring means passing the cutting mechanism hereinafter fully described. The upper roller 81 (see Figure 7) is a pressure roller and it is not positively driven. The lower roller 79 mounted on the frame of the machine on suitable bearings is periodically actuated by the action of a segmental gear 82 which meshes with pinion 83 fixed to the outer end of a Horton clutch 84 mounted on the shaft 85 of said roller 79.

Figure 8:
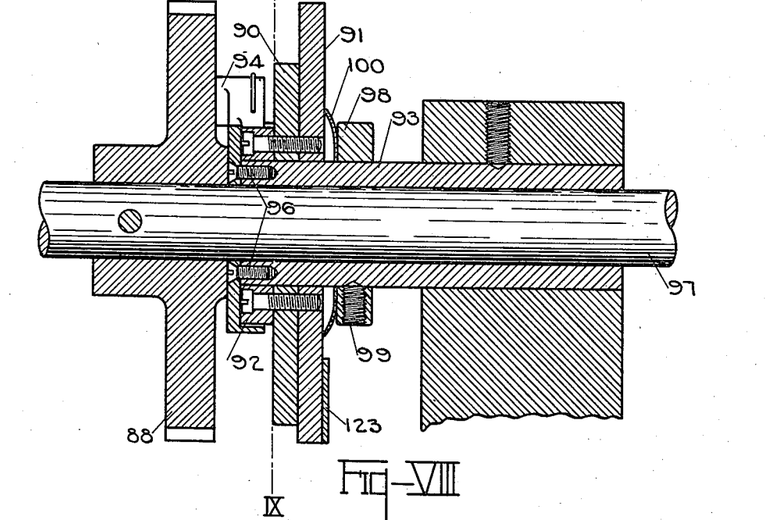
Figure 8 is a sectional view taken on the line VIII—VIII of Figure 2.

The segmental gear is moved by a roller 86 mounted on projection 87 extending from the hub of said segmental gear and bearing against the surface of a heart shaped cam 88, fixed to shaft 97 driven by suitable gearing connections from counter shaft 45 as shown in Figures 2 and 8, by means of spring 89 fixed to said arm and to the frame of the machine. Spring 89 tends to return the segmental gear to initial position and thus rotate the pinion 83, but due to the action of the Horton or one way clutch 84 the lower roller is not driven by said gear when said return movement takes place. To vary the amount of the return movement of the gear 82 and at the same time the point of contact of the roller 86 with its cooperating cam 88 I provide the extension 87 with a finger 78, the latter bearing against a cam 90 of such contour that its rotation places the roller 86 in different positions out of the path of the continuously rotating heart shaped cam 88 thereby allowing the segmental gear 82 to rotate pinion 83 in progressively increasing periods whereby the roller 79 and its pressure roller 81 operates to draw paper in increasing amounts from the source of supply 80.

Figure 9:
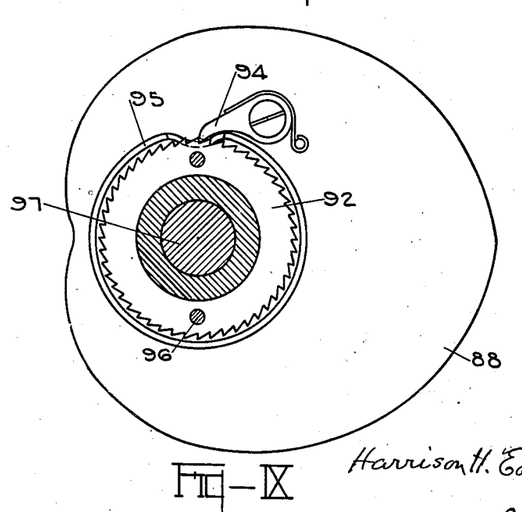
Figure 9 is a sectional view taken on the line IX—IX of Figure 8.

The cam 90 acting as indexing means for the measuring means and cam 91 that actuates the cutting mechanism when the last layer of wire has been wound, as will hereinafter be described are fixed to a ratchet 92. Said ratchet 92 and cams 90 and 91 are loosely mounted on a sleeve 93 fixed to the frame of the machine by a screw. To drive said ratchet and the cams fixed thereto I provide pawl 94 mounted on the continuously rotating heart shaped cam 88 which rides on a casing 95 fixed to sleeve 93 by means of screws 96. Said casing 95 (see Figure 9) has a recess or cut portion which permits pawl 94 to engage one tooth of said ratchet advancing the same every revolution thereby driving ratchet 92 and cams 90 and 91. To prevent the shifting of the ratchet out of engagement with its driving pawl I provide block 98 fixed to sleeve 93 by means of screw 99 holding spring washer 100 against the loosely mounted ratchet 92 and cams 90 and 91 preventing its shifting position.

Manual means are provided for the actuation of the roller 79 to draw paper from the source of supply 80. To this end I provide a hand operated wheel 101 that can be rotated by the operator so as to draw any desired amount of paper.

Figures 5, 6:
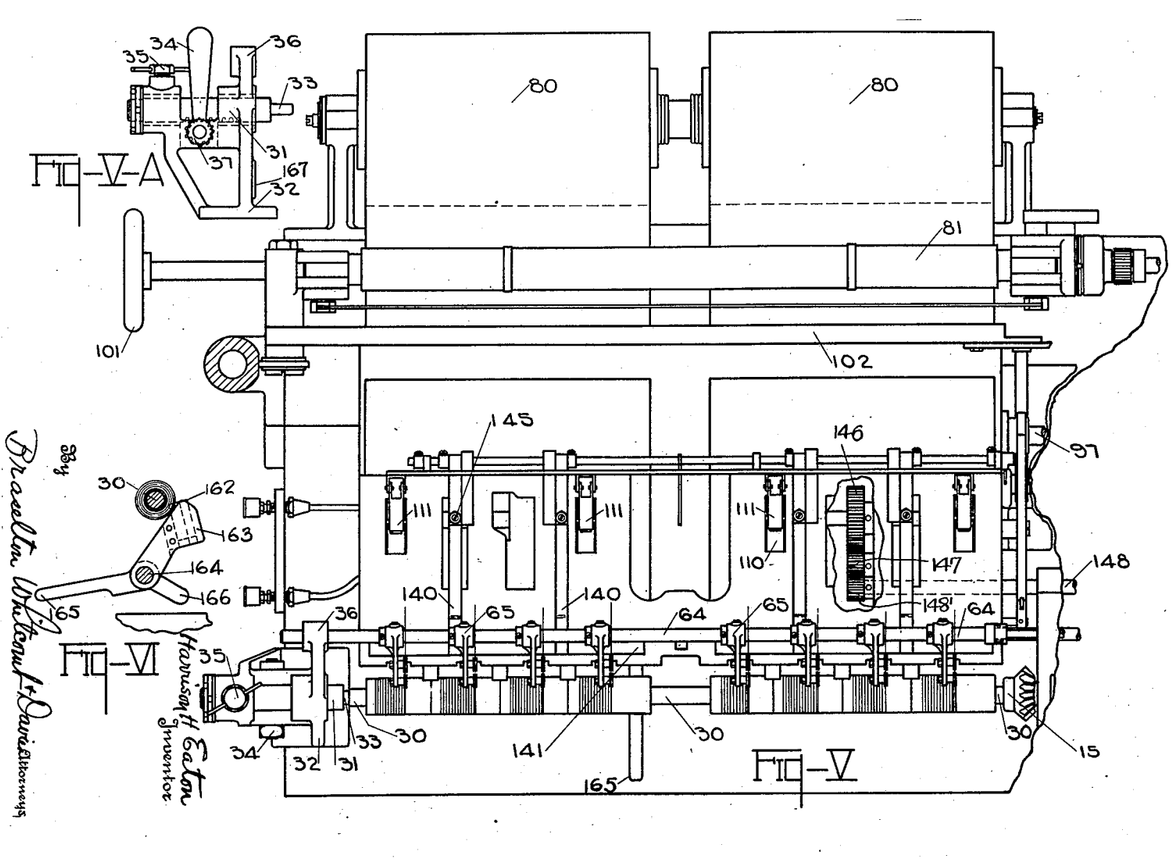
Figure 5 is a plan view of a portion of the coil winding machine, with the frame holding the wire spools removed.
Figure 6 is a sectional view illustrating the paper severing means used to separate the different coils.

As stated, the paper when fed a certain amount by the measuring device is periodically cut off into measured lengths for insertion as the insulating means between adjacent layers of wire on the coil. The paper cutting mechanism includes a movable knife 102, the location of which is shown in Figure 5 and the details in Figures 11, 12 and 13, pivoted at 103 to be drawn down against the stationary cutting agent 104 by a periodically operated mechanism at the opposite side of the pivot bringing this periodically operated mechanism including a pivoted arm 105 to which is connected a draw arm 106 in turn pivoted to a cross member 107 carrying a cam roller 108 adapted to engage a cam 109 on a shaft 97, said shaft having been heretofore described and illustrated in Figures 7, 8, and 9 as carrying the heart shaped cam. A resilient means such as the coil spring 120 is arranged to bear against the movable cross arm 107 normally returning the movable knife blade to its upper position.

Figures 11, 12, 13:
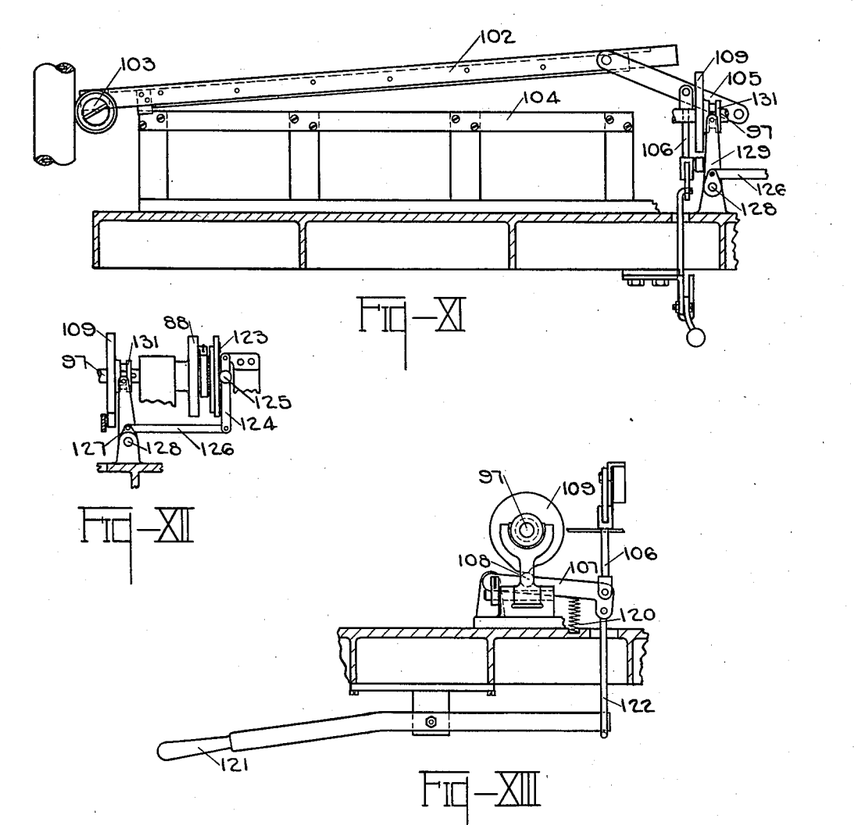
Figure 11 is a front elevation showing the paper severing mechanism.
Figure 12 is a detail view of the paper knife actuating mechanism.
Figure 13 is a side elevation of the knife actuating mechanism showing it in connection with the manual control.

Means are provided for manually cutting the paper when desired. To this end I have provided a handle 121 pivoted underneath the sub-frame of the machine as shown in Figure 13 and carrying a rod 122 with it to the cross piece 107. It will be evident that the operator can thereby operate the knife manually.

In the cycle of operation of my machine I desire to throw the knife cutting means out of engagement when the last layer of wire has been wound, as it is undesirable to cut the last piece of paper.

Thus, as shown in Figures 8 and 12, associated with the paper measuring mechanism is a cam heretofore described shown in Figure 8 which carries a lug 123 shown in Figures 8 and 12. Pivoted to the supporting standard of this mechanism is a lever 124 carrying a roller 125 adapted to be actuated by said lug 123. The lever 124 is pivoted to an extension rod 126 connected by crank 127 to the rock-shaft 128 which carries a forked lever 129 engaging a collar 131 on the shaft 97 which carries the main knife operating cam 109 heretofore described. When the lug operates at the proper time this mechanism throws the cam 109 out of engagement with the roller of the knife operating lever mechanism.

Figures 7, 10:
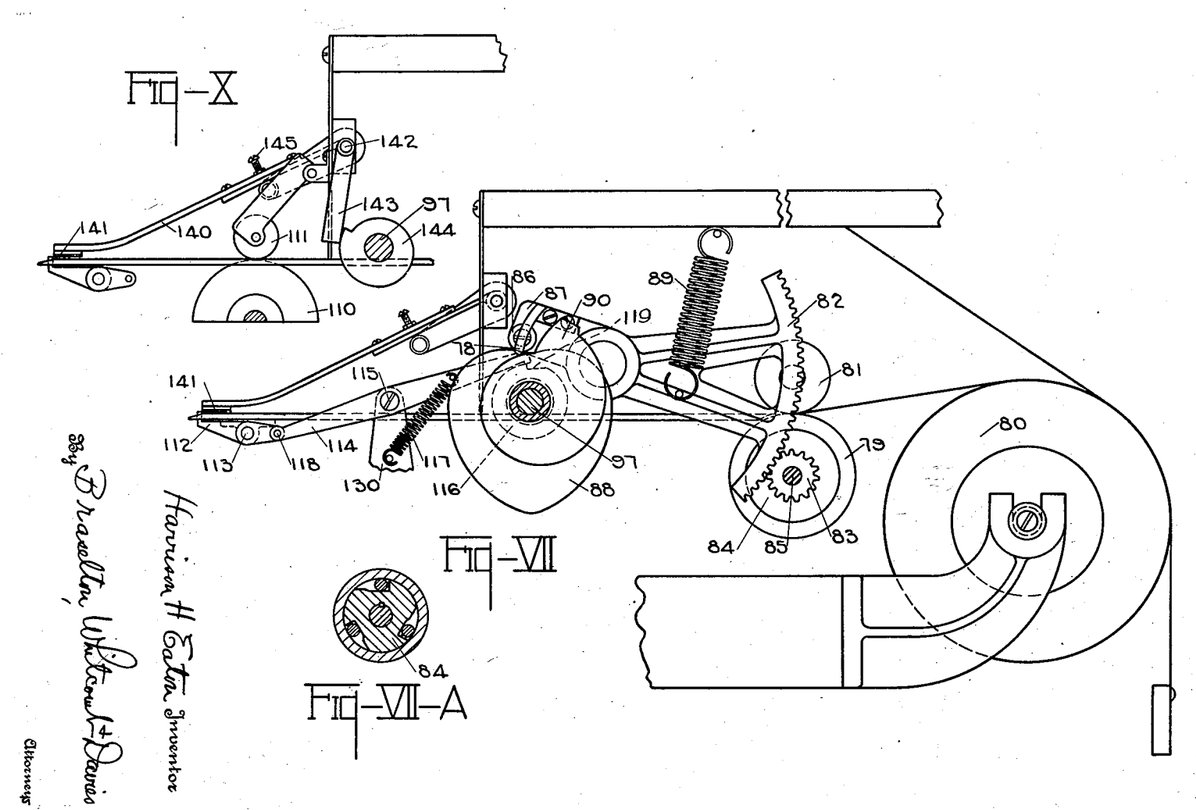
Figure 7 is a sectional view taken on the line VII—VII of Figure 2.
Figure 10 is a side elevation illustrating the paper transferring mechanism.

My machine is so arranged that the minimum length of paper drawn from the source of supply by the measuring means passes under the featherweight rollers 111 (see Figures 5 and 10) and its cooperating continuously rotating rollers 110 provided for the purpose of transferring the paper after the same has been cut to a releasable stop or gate 112 shown in Figure 7.

The rollers 110 are continuously driven by gears 146 and 147 and 148' (see Figure 5) from a shaft 148, which shaft (see Figure 2) has a plurality of speed drive connections with the main driving shaft 15 of the machine so that the rollers 110 will be driven at substantially the same rate even though the spindle 30 be driven at different rates.

Gear 150 is fixed to shaft 148 and drives the same by a gear fixed to a shaft 151 driven by worm wheel 152 in which a pawl 153 is fixed, cooperating with a ratchet 159 to drive said shaft in only one direction. The worm wheel 152 meshes with worm 154 loosely mounted on shaft 15. Said worm 154 is driven by the engagement of collar 155 slidably mounted on shaft 15. Said collar 155 is controlled by the movement of lever 40 by means of a flexible spring connection in arm 158 which actuates member 156 pivoted at 157, imparting the desired movement to collar 155 thus producing the engagement of said worm 154 with shaft 15. The flexible spring connection in arm 158 is provided to permit a sliding action of the teeth of collar 155 and the corresponding teeth on worm 154 without breaking the same, when they are not in proper relationship for the engaging operation.

The movement of lever 40 toward the left will disengage collar 155 from worm 154 by the action of the cooperating lever 156 and the flexible spring connection 158 and will throw collar 155 into engagement with gear 160 driving the same which in turn will drive shaft 148 by its fixed gear 161, turning the same at a different speed in relation to the main driving shaft 15. The gear ratios of the two mechanisms described as used to drive shaft 148 are of such nature that the driving rollers 110 are driven at a substantially constant speed during the transferring action of the insulating paper to the spindle.

The gate 112 cooperating with the roller 110 is actuated in timed relation to the slowing action of the winding spindle which takes place at the beginning and end of each layer of the coil as will be described. Thus, as shown in Figure 7, the gate 112 is pivoted at 113 and fixed to lever 114 at end 118. Said lever 114 is pivoted at 115, and is actuated by a cam 116. To insure the cooperating action of cam 116 and the lever 114 I provide spring 117 fixed to the bearing block 130 and lever 114. Said cam 116 is provided with a recess 119 in order to move the gate out of the path of the insulating paper, permitting the continuously rotating rollers 110 cooperating with the featherweight rollers to transfer said paper to the spindle.

Cooperating with said gate and transferring means, I provide a pressure bar 141 having a felt pad acting over the width of the paper and controlled by arms 140 pivoted at 142 and actuated by an extension 143 cooperating with a cam 144. I provide a screw 145 to regulate the pressure of said bar to the paper. The cam 144 is so constructed as to permit a maximum pressure to be applied to the paper as the same is partially wound by the rotating action of the spindle, after its insertion on said spindle. Said pressure is gradually decreased as the paper is wound.

As a part of the operation of my machine I have provided electrically controlled means for stopping the mechanism at certain periods or if the wire on any bobbin accidentally becomes broken.

Figure 18:
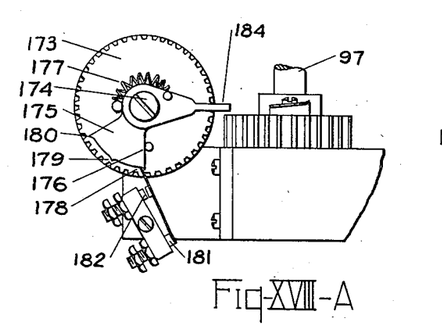
Figures 15, 16, 17, 19:
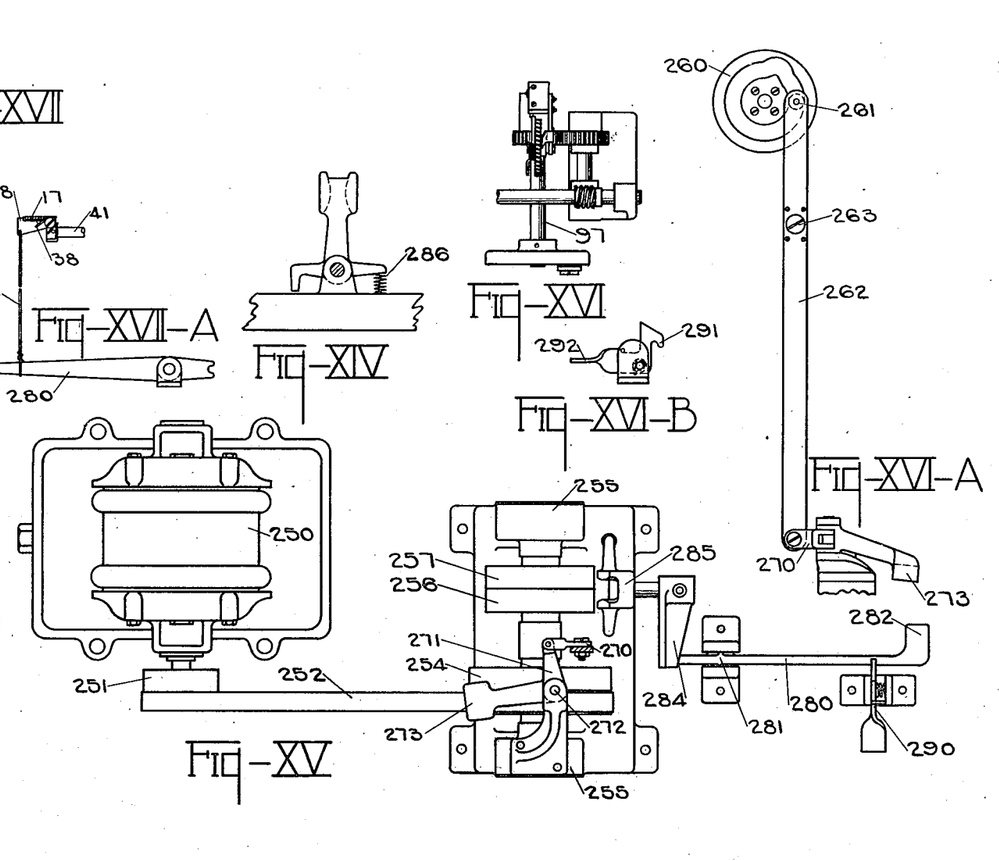
Figures 18, 19, 20:
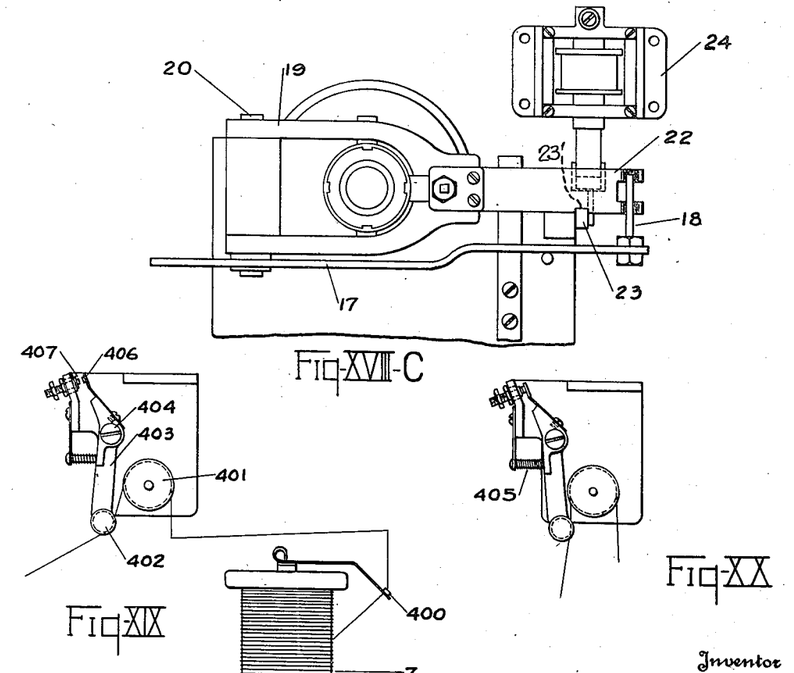

The electrical circuits and certain parts of the mechanism for accomplishing the automatic stopping of the machine are shown in Figures 18 to 20. Thus, the wire comes off the bobbin 7 and goes to guide 400 and then passes over a roller 401 bearing against and applying a tension to roller 402 on an arm 403 pivoted at 404, the tension of the wire on the roller 402 swinging the arm slightly on its pivot. Spring 405 is provided to control the motion of the arm 403. The arm 403 has an extension carrying one terminal of a contact switch 406, the other of which is shown at 407, carrying it by a fixed part of the machine. The contacts 407 which are referred to are in an electrical circuit throughout the lead wire 408 connected with the solenoid 24 which controls a lever 23 for operating the main clutch of the machine. When a wire breaks the tension on the roller is released and the contacts are made to energize the solenoid which actuates its plunger and moves lever 23 which relieves a keeper which holds a spring 21 from releasing the main clutch member 16 from its rotating clutch member 12 that drives the machine as shown in Figures 18 and 2. The plunger of the solenoid 24 operates on the lever 23, said lever having a notch 23' into which the edge of an arm 22 is moved by the operator in setting the mechanism and throwing in the main clutch. The mechanism I provide for this includes an arm 22 fitted in the notch 23' of the lever 23. The arm 22 is carried by the yoke 19 which yoke is pivoted at 20 and has means shown in the pin 18 for engaging the clutch collar on the main driving shaft 15 which collar operates the main clutch 16 as stated. The arm 17 with a projection 18 engages the arm 22 when the operator moves the arm 17 thus latching arm 22 in the notch 23' of the lever 23. The clutch releasing spring 21 bears on one end against the fixed portion of the frame and on the other against the yoke arm 19. The forked lever arm has a projection bearing against a spring contact 25 adapted to be closed against the stationary contact 26 by said projection when the machine is set in operation.

In my machine I have also provided means to stop the machine at certain periods in the cycle of its operation which is electrically operated and which is shown in Figure 18, etc. This means is provided to stop the machine after three layers of wire have been applied (in the type of coil illustrated herein), also at the third from the last layer to enable the operator to change the mechanism of the machine in order to wind the wire with these turns spaced a different amount from the adjacent turns as is shown in Figure 23 and also to stop the machine when the coils have been completed to enable the operator to remove them from the machine. Thus, in Figures 18, 18A and 18B it is seen that I provide a shaft 97 carrying spur gear 171 which is the means for driving the shaft 97. The gear 171 carries an extension tongue 172 which is adapted to engage the spiral gear 173 rotating the same one tooth each revolution of the projection 172. The gear 173 is mounted on a central shaft 174 and carries a bell crank 175 adapted to be rotated by a pin 176 on the gear 173. The bell crank 175 is free to move ahead of the pin 176 but a spiral spring 177 is connected between the bell crank 175 and the face of the spiral gear 173 to normally hold the bell crank against the pin 176. The bell crank 175 has three projections 178, 179 and 180 which are adapted to contact with the spring arm of one of the two electrical contacts 181, 182. The bell crank 175 has an extended projection 184 which passes by the edge of the teeth of the spiral gear 173. The spur gear 171 carries an additional lug 185 adapted to contact with the lip 184 on the bell crank 175 on the rotation of the gear 171 which occurs when the lip 184 is in the vertical position shown in Figure 18B. It will be noted from Figure 18C that the lug 185 is diametrically opposite the lug 172 and in a position to close the contacts 181, 182 at a half revolution before projection 172 would rotate the gear 173 to close the contacts so that the machine will be stopped at the end of a layer in contradistinction to the stopping of the machine automatically in the middle of a layer as is the case when said contacts are actuated by the other two projections on the bell crank 175. When the lip 184 is in the vertical position the lug 185 moves the bell crank 175 direct, a spring 177 on the face of gear 173 returning the driving pin 176 after lug 185 has passed its position in contact with the bell crank 175.

From Figure 18 it will be seen that the contacts 181, 182 are in the same circuit heretofore described for the solenoid which actuates the release of the main driving clutch for the entire machine.

Figure 17:
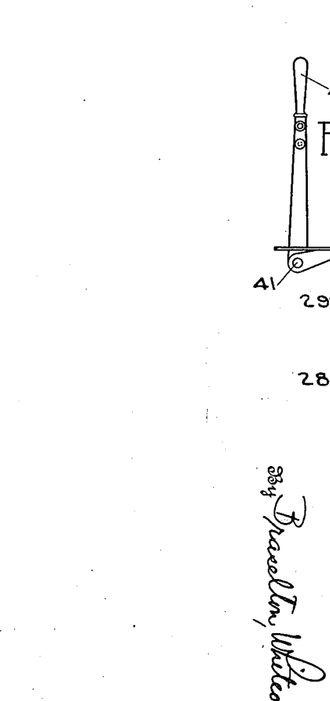

As shown in Figures 15 to 17 I provide in this machine means for changing the speed of the main drive to the main drive shaft from the source of power shown as a motor 250 Figure 15. The motor pulley 251 drives a belt 252 to a gear change mechanism 255 from which a belt drives the main driving pulley 13 shown in Figure 2, the specific arrangement shown in Figures 15 to 17 being modifications of the arrangements suggested in Figures 1 and 2 in which the action of cam and cooperating levers controls the motor connections to slow down the same, as for example, the shifting of a third brush or the change of a resistance in the field of said motor.

I find it very desirable for the efficient operation of my machine to drive the spindle at a slower rate when the paper sheet is transferred to said spindle to be wound between the layers of said coil preventing the danger of tearing or injuring the paper, which will take place if the paper is wound at the same rate of speed at which the wire is wound.

Every time an insulating sheet is to be inserted between layers the belt 252 is shifted to the driven pulley 254 which through a conventional type of gear change mechanism 255 will drive one or the other of the auxiliary drive pulleys 256 and 257 at a reduced speed. Either one or the other of these auxiliary drive pulleys is used depending upon whether the coil is being wound with turns close or spaced from each other. In either event automatic means are provided to slow down the drive when the paper is inserted, an example of such means being shown in Figure 16A where it will be seen that a positive groove cam 260 is connected to the roller 261 of the lever 262 pivoted at 263, the cam 260 being adapted to be driven in timed relation to the mechanism from a worm 134 as shown in Figure 2, the cam 260 in the illustration in Figure 16A being a modification of that shown in Figure 16A. On the other end of the lever 262 is a link 270 pivoted to a throw-over bell crank arm 271 pivoted to 272 and carrying at its other end a belt throwing lug 273.

The belt bearing on the pulleys 256 and 257 is intended to be shifted manually by the operator through the mechanism illustrated in Figure 15. Thus it will be seen that I provide a treadle 280 pivoted at 281 having a foot extension 282, the other end of the lever 280 contacting with a throw-over crank arm 284 which carries the belt shifter 285 operating against the spring 286 as shown in Figure 14, it being necessary for the belt shifter 285 to be held against the tension of the spring 286 by a latch mechanism 290 of any desired form shown in Figures 16 and 16B which has a spring pressed hook 291 for automatically latching over the edge of the treadle 280 when the operator depresses the same, but it may be released by the operator by reason of the bell crank extension 292 on the latch as shown in Figure 16B.

When it is desired to change from solid to spiral winding the feed to spindle 30 is made greater by the guiding mechanism by means of shifting lever 40 to the left. It is necessary that the speed of shaft 45 be reduced or the feed member 66 will travel at a speed so great as to break or not shift from one screw threaded shaft to the other properly whereby the operator actuates treadle 282 which controls the belt shifting mechanism to shift the belt whereby shaft 15 is rotated at slower speed than in its previous operation. To insure that the reducing of speed has taken place prior to starting the machine I provide a lock 28 acting on lever 17 which controls the clutch. Said lock is controlled by the operation of lever 40 and treadle 282. When lever 40 is shifted to the left shaft 41 which is pinned in lever 40 turns lifting cross bar 29 which is also pinned to shaft 41, the lock 28 which is pivoted to cross bar 29 is then in upward position over lever 17 and held there by means of spring 38 making it impossible to move starting lever 17 unless treadle 282 is employed which has a wire 39 fastened from said treadle to said lock, (see Figure 17A). The spring 38 is fastened from lock 28 to cross bar 29 so as to permit the operation of treadle to unlock and permit the actuation of lever 17 to start the machine.

I desire to sever the insulating paper between the adjacent ends of the coils when a plurality of insulating sheets of paper have been wound upon the spindle. The mechanism for severing the insulations consists of a plurality of blades 162, Figures 1, 5 and 6, uniformly spaced from each other, mounted on holders 163 which are fixed to shaft 164 journalled at 167 and 168 and adapted to be moved by handle 165 into the path of the rotating coils and thereby severing several thicknesses of paper wound upon the spindle. The blades can be independently removed from their holders when it is desired to resharpen the same. I provide an extension 166 used as stop when the blades are not actuated by the operator so as to have the same ready for actuation.

The method of operation of my machine is as follows: Referring to Figure 1 it will be seen that an operator inserts a plurality of bobbins 7 in the left hand frame 5, the wire from each being passed over the contact mechanism at the top of the frame, illustrated more in detail in Figures 19 and 20, down to the cores of the coils located on the spindle 30. Referring to Figures 21 to 26 it will be seen that the core 300 of each coil has a terminal wire 301 passing inside the tube 300 and through the wall of the core as indicated at 302 and Figure 21 to which the wire from the bobbins 7 is soldered. Several cores so connected with wires from bobbins 7 are slid lengthwise on the spindle 30 shown in Figure 26, the wire 301 fitting in the groove 305 so as to form the driving connection heretofore described.

Referring again to Figure 1 it will be seen that the operator swings a frame 5 around into position at the right in Figure 1 and places the spindle 30 in chucks in the machine, the details of which are shown in Figure 5A heretofore described.

In the beginning the coil is wound as shown in Figure 23, that is, spirally wound on each turn in substantially spaced relation with the adjacent turn, this arrangement being employed for the first three layers, thereafter the majority of the layers of wire being close wound as indicated in Figure 24, there being three layers at the end of the coil which is again spirally wound making the completed coil appear as in Figure 25, it being understood that a sheet of insulating paper is inserted between each layer whether close or spirally wound.

The main drive for the spindle 30 is shown in Figure 2 where it will be seen that the pulley 11, being driven from a motor 10 (see Figure 1) drives the clutch pulley 12 which may be connected by a hand controlled clutch 16 through the operating handle 17 with the main drive shaft 15 and rotate the same. This shaft extends through to drive the spindle 30 shown in Figure 2.

While the spindle 30 is being rotated the wire guides 65, carried by the shaft 64 shown in Figures 1, 2 and 5, are made to reciprocate to apply the wire in layers, the reciprocating means being shown in Figures 2, 3 and 3A consisting essentially of the feed screws 57 and 60 rotating in opposite directions adapted to be engaged by the feed nut 66 which is secured to the rod 64. The drive for this traverse mechanism comes from the main drive shaft 15 of the machine and includes two speed drive connections, one being through the worm 43 (Figure 4), worm wheel 44 which drives shaft 45 the latter carrying driving gears 55 and 56 which operate gears 58 and 59 for the screw shafts 57 and 60.

The second speed drive for the wire traverse which operates the feed screws 57 and 60 winding the wire in different spacing, spiral or close as the case may be, includes as shown in Figure 4 a gear 200 mounted on the main drive shaft 15 driven therefrom by a clutch 42 which gear 200 meshes with a gear 201 mounted on a shaft carrying a gear 202 (Figure 2) which meshes with a gear 203 arranged to drive the shaft 45 at a different speed from the speed at which the latter is driven from the worm 44. As shown in Figure 4 the operator manipulates the handle 40 to throw the clutch 42 into engagement to drive the gear 200 applying the brake 210 to prevent the worm 43 from rotating or moves the same in the opposite direction to connect the clutch collar 42 with the drive for the worm 43.

It will be understood that the feed nut 66 must be thrown at each end of the traverse from one feed screw 57 to the other feed screw 60, mechanism for accomplishing this being shown in Figures 3 and 3A, this mechanism having been heretofore described and the operation depending upon a cam contacting with projection of rocking member carried with the feed nut, the same operating in a toggle manner to throw the feed nut over positively from one screw to another at the end of its travel.

As heretofore stated a sheet of insulating paper is inserted between each layer and as the coil increases in diameter the length of the paper is increased accordingly, the paper being supplied from the continuous roll, measured, and supplied from the source to a transferring feed mechanism, cut off and fed to the spindle. The drive for this mechanism is from the main drive shaft 15 by way of the counter shaft 45 shown in Figure 2 which has a worm 134 thereon meshing with the worm gear on the jack shaft 134' carrying a gear for driving the gear 171 on the controlling cam shaft 97 shown in Figures 2, 7, 8 and 9. Adjacent this cam shaft is the measuring gear segment 82 and pinion 83, the detailed operation of which has heretofore been suggested in the description, it being understood that the operation of the segment in varying amounts by the spring 89 determined by the position at which the roller 86 contacts with the heart shaped cam 88 to draw varying amounts of paper from the supply roll 80' and feed the same to the transferring feed mechanism comprising the rollers 110 and 111, the paper being cut into individual sections by the knife mechanism 102 shown in Figures 2, 5 and 11 to 13, the details of its operation being understood from the foregoing, the same being timed with relation to the measuring feed mechanism by the cam 109 on the shaft 97 shown in Figures 2, 12, and 13. In Figure 13 it will be seen that as the high spot of the cam contacts with the roller 108 the cutter which is connected to the draw bar 106 will be drawn down, compressing the spring 120, and that as the high spot of the cam 109 passes by roller 108 the spring 120 returns the draw bar and blade 102 to normal raised position. It is noted in Figure 13 is shown means for cutting the paper manually by handle 121 connected through levers 122 to the draw bar 106. The gear rotating between the cam shaft 97 which operates the cutter controlling cam 109 and the other controlling cams to the main winding drive shaft 15 provides for the measuring, feeding and cutting of the paper after a layer of wire has been placed in the coil.

Special reference is made to the feature of my invention wherein the individual paper sheets are satisfactorily fed, after being cut, to the coil being wound on the spindle, the structure being shown more in detail in Figures 5, 7 and 10. Thus, the paper before being severed from the supply rolls 80 extends between rollers 110 and 111, the former being continuously driven and the latter being of a certain weight relative to the paper that the friction thereon is sufficient to cause the paper to be moved forward toward the spindle and its front edge contacts with the stop gate 112, the lightness of the roller 111 thereafter permitting continuous rotation of the roller 110 without wrinkling, distorting or crumbling the paper sheet. At a proper timed relation to the sequence of operations the gate 112 is released by a cam 116 shown in Figure 7 against the spring 117 which normally holds the gate 112 in stop position.

A further feature of my invention includes the provision of a pressure bar 141 shown in Figures 7, 10 and 11, which bar extends clear across the machine to apply pressure across the width of the paper, two rolls of paper being shown and used in my present embodiment of my invention as shown in Figure 5. Referring to Figure 10 it will be seen that the bar 141 is controlled by an arm 140 pivoted at 142 provided with an extension 143 contacting with the controlling cam 144 driven from the main controlling cam shaft 97. At each revolution of the cam 144 it will be seen that the arm 143 raises the presser bar permitting feeding of the paper to the gate 112. As soon as the gate is released the cam is so timed as to permit the feeding rollers 110 to transfer the paper to the coil on the winding spindle inserting the same between the upper surface of the last layer and underneath the first turn of the wire on the succeeding layer. After the paper reaches the winding spindle the high speed of the same tends to quickly draw the sheet from the rollers 110 and 111, the relative friction of which permits such action but the cam 144 is so constructed as to permit at this instant that the maximum pressure be applied across the entire width of the paper which pressure gradually decreases preventing thereby wrinkling, distorting or otherwise injuring of the paper and facilitating the smooth application of the same to the coil. When the paper is inserted in the coil the driving spindle 30 is reduced in speed from the main drive source of power by the action of a cam 260 shown in Figure 2, controlling through suitable levers the speed of the electric motor which drives the machine. A modification of this control is shown in Figures 14 to 17 which operates from the same controlled cam shown in Figure 16A to shift the belt drive of the mechanism to change the speed as has heretofore been described.

As heretofore indicated one of the objects of the present invention is to wind the wire in turns which will be spaced apart for some of the layers of the coil as shown in Figure 23 and close together in other layers as shown in Figure 24 and finally at the end to again space the turns as shown in Figure 25. To accomplish this I reduce the drive of the spindle by changing the speed of the drive from the motor 250 shown in Figure 15, which change of speed is controlled by the operator through the treadle 282 previously described, the operator actuating the same when the machine has been automatically stopped by the electric control thereof as will be described. After three layers of the spiral winding shown in Figure 23 the operator moves the treadle, the machine having been stopped as stated, to throw the high speed gear in which increases the speed of the drive shaft 15. This likewise increases the speed of the countershaft 45 the operator also manipulating the hand controlled lever 40 as shown in Figures 2 and 4, to which the speed of the wire traverse driving mechanism compared with the main drive shaft 15 as has been described supra. By this arrangement it will be seen that when the spindle is driven faster the entire paper measuring, cutting, feeding and transferring apparatus have likewise been correspondingly speeded up as they are driven from the counter shaft 45. After a large number of turns have been applied as shown in Figure 24 the machine again automatically stops and the operator shifts a treadle 282 and lever 40 back to the position to spirally wind the wire and accomplishes the same as shown in Figure 25.

The machine is automatically stopped to permit the operator to manipulate the treadle 282 and lever 40 as indicated, by the electric control provided for this purpose as shown in Figures 2, 18, 18B and 18C, which mechanism has heretofore been described.

At the beginning of a coil, three layers of spiral winding are applied as shown in Figure 23. At this time lug 185 operates to move 178 to close the contacts shown in Figure 18A to energize the solenoid 24 of Figure 2 to release the clutch. The operator now changes the machine to close winding as stated above. Thereupon forty-one and one half layers (in the present instance) are wound until projection 180 (Figure 18A) is moved nearly 360 degrees being advanced by the tooth 172 engaging the teeth of gear 173 as heretofore set forth, to thereby again close the circuit to solenoid 24 and again release the main driving clutch. Here the operator shifts back to produce spiral winding, the machine having stopped midway of a layer as tooth 172 is 180 degrees from lug 185. The spiral winding continues for three layers ending midway as shown in Figure 25, the machine being stopped by the middle of the three lugs 179, the same being advanced three turns by the lug 172 engaging wheel 173 all as described supra.

The electric control also stops the machine automatically when a wire breaks as heretofore indicated, since as shown in Figures 19 and 20, the tension of a wire in place separates contacts 406, 407 but when a wire becomes broken, will release this tension and close these contacts energizing solenoid 24 thus stopping the machine by release of the main clutch.

Manual means are provided to operate the machine when the power fails or it is desired by the operator. For that purpose I provide a hand wheel 136 that rotates shaft 137 which is mounted on suitable bearings (see Figure 2). Gear 138 is fixed to said shaft and is adapted to mesh with gear 139 fixed to main shaft 15. Said gears are normally out of engagement by means of a spring on shaft 137 not shown but are adapted to be moved into engagement by the longitudinal movement of hand wheel 137 against said spring whereby the rotation of said hand wheel will operate the machine.

Having described my invention, what I claim and desire to secure by Letters Patent is:

1. In a machine, a wire layer winding mechanism; a sheet insulating material winding mechanism therefor, including a feeding mechanism for the sheet material; a gate to prevent said material from being wound on said wire; means to intermittently release said gate to permit said material to be wound; and means to apply pressure to said sheet after said gate has been released and reduce the pressure as the sheet is being wound on said wire.

2. In a machine, a wire layer winding mechanism; a sheet insulating material winding mechanism therefor, including a feeding mechanism for the sheet material; a gate to prevent said material from being wound on said wire; means to intermittently release said gate to permit said material to be wound; means to apply gradually decreasing pressure to said sheet after said gate has been released; and means operative to cause said sheet material to be fed and wound on said wire upon the release of said gate.

3. An insulated wire coil winding machine comprising a rotary spindle, a guiding traverse and an insulating sheet applying means therefor to wind the wire in layers insulated one from another; a shaft for rotating said spindle; means operated from said shaft for driving said wire traverse at one speed relative to said shaft; means for operating said sheet applying means from said shaft; means operating said shaft at a reduced speed; means to drive said guiding traverse at another speed relative to said shaft; and means for changing the driving connections of said sheet applying means from said shaft when said shaft is driven at said reduced speed.

4. In a mechanism, a means for feeding a material intermittently comprising a continuously operating feed mechanism; a stop for the material; means to release said stop to permit feeding of said material; and means to apply gradually decreasing pressure to said material as it is being fed.

5. A material feeding mechanism comprising a releasable stop against which said material is held at certain periods of operation; a plurality of rollers continuously operating; a plurality of loosely mounted relatively lightweight rollers cooperating with said first mentioned rollers whereby said material may be fed by said rollers and may operate without distorting said material when the same is held by said stop; means to release said stop; and decreasable pressure applying means engageable with said material and having means in common with said stop releasing means to operate the same.

6. In a winding machine, a coil winding driving mechanism; a plurality of frames for carrying wire in a spool to be wound into coils; means whereby one frame is located in the machine to supply wire to the winding driving mechanism to be wound and the other frame is in another position for an operator to apply wire to said other frame; and means whereby the positions of the frames may be changed.

7. In a coil winding machine, a winding mechanism driving a removable spindle to wind coils therearound; a plurality of frames for carrying wire bobbins and a spindle holding a core for a coil; means whereby one frame is located in the machine with the spindle in the winding mechanism and the other frame is in a position at the side of the machine for an operator to load wire in said frame and attach said wire to cores located on the auxiliary spindle to be rotated therewith when inserted into the driving mechanism; and means whereby the positions of the frames may be interchanged one with the other.

8. In a machine, a wire layer winding mechanism; a sheet insulating material winding mechanism therefor, including a feeding roller for the sheet material; a gate to prevent said material from being wound on said wire; means to intermittently release said gate to permit said material to be wound; and means to apply pressure to said sheet after said gate has been released and the sheet is being wound on said wire including: a pressure bar, a pivoted arm carrying said bar, an extension from said arm and a cam periodically operated to actuate said arm.

HARRISON H. EATON.